(12) United States Patent
Sheerin

(10) Patent No.: US 9,336,622 B2
(45) Date of Patent: May 10, 2016

(54) SYSTEM AND METHOD TO ACHIEVE BETTER EYELINES IN CG CHARACTERS

(75) Inventor: Daniel Paul Sheerin, Westchester, CA (US)

(73) Assignees: SONY CORPORATION (JP); SONY PICTURES TECHNOLOGIES INC., Culver City, CA (US)

( * ) Notice: Subject to any disclaimer, the term of this patent is extended or adjusted under 35 U.S.C. 154(b) by 627 days.

(21) Appl. No.: 13/551,040

(22) Filed: Jul. 17, 2012

(65) Prior Publication Data

US 2014/0022261 A1     Jan. 23, 2014

(51) Int. Cl.
    *G06T 13/40*     (2011.01)

(52) U.S. Cl.
    CPC ....................................... *G06T 13/40* (2013.01)

(58) Field of Classification Search
None
See application file for complete search history.

(56) References Cited

U.S. PATENT DOCUMENTS

| 6,507,359 | B1 * | 1/2003 | Muramoto et al. | ............. 348/47 |
| 6,545,650 | B1 | 4/2003 | Yamada et al. | |
| 2005/0099603 | A1 | 5/2005 | Thomas et al. | |
| 2005/0219694 | A1 | 10/2005 | Vesely et al. | |
| 2006/0239670 | A1 | 10/2006 | Cleveland | |
| 2011/0018862 | A1 | 1/2011 | Epps | |
| 2013/0083009 | A1 * | 4/2013 | Geisner | ................... A63F 13/02 345/419 |

OTHER PUBLICATIONS

Marcus Thiebaux, Brent Lance, and Stacy Marsella. 2009. Real-time expressive gaze animation for virtual humans. In Proceedings of the 8th International Conference on Autonomous Agents and Multiagent Systems—vol. 1 (AAMAS '09), vol. 1. International Foundation for Autonomous Agents and Multiagent Systems, Richland, SC, 321-328.*

* cited by examiner

*Primary Examiner* — Phi Hoang
(74) *Attorney, Agent, or Firm* — Mark D. Wieczorek; Mayer & Williams PC

(57) ABSTRACT

Systems and methods are provided to create better-looking animated eyes for CG characters. The systems and methods set the rigging of each eye to, rather than precisely converge on a target location, converge but be rotationally or angularly offset by a certain amount to simulate correct physical eye positioning and movements. In addition, the systems and methods provide even more realistic eye appearance by taking account of the refractive properties of the cornea, e.g., which can make the pupil appear larger than it actually is. The systems and methods may further take account of a shadowing effect of the upper eye caused by the brow, eyelashes, and upper lid (as well as an effect caused by reflection from the underside of the eyelashes). This darkening of the upper portion of the eye addresses vertical eyeline discrepancies caused by the visual and optical illusion of incorrect lighting.

10 Claims, 10 Drawing Sheets

TOP VIEW

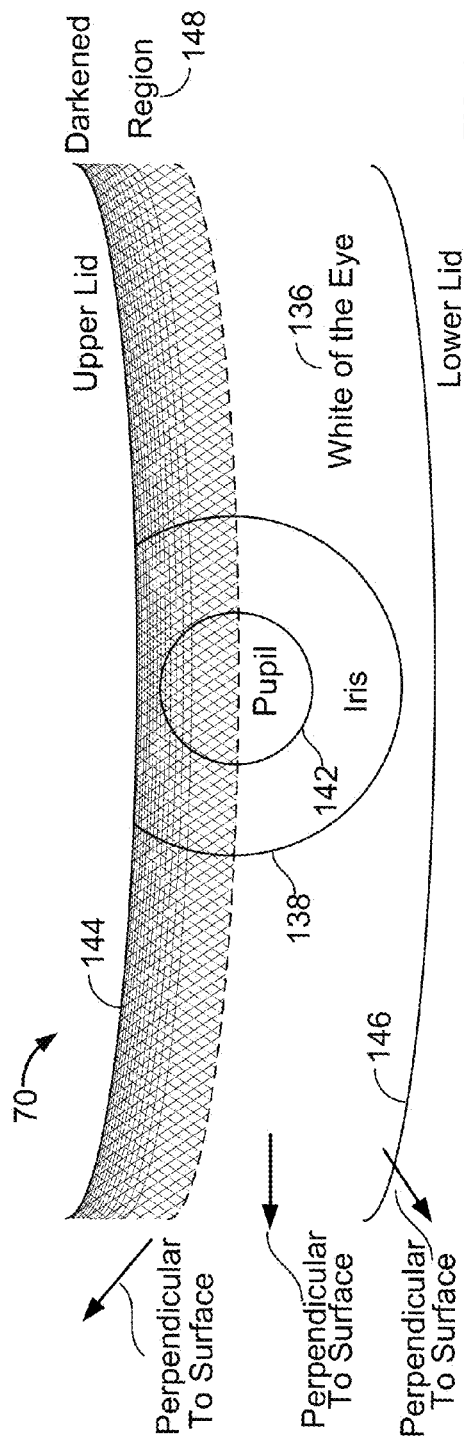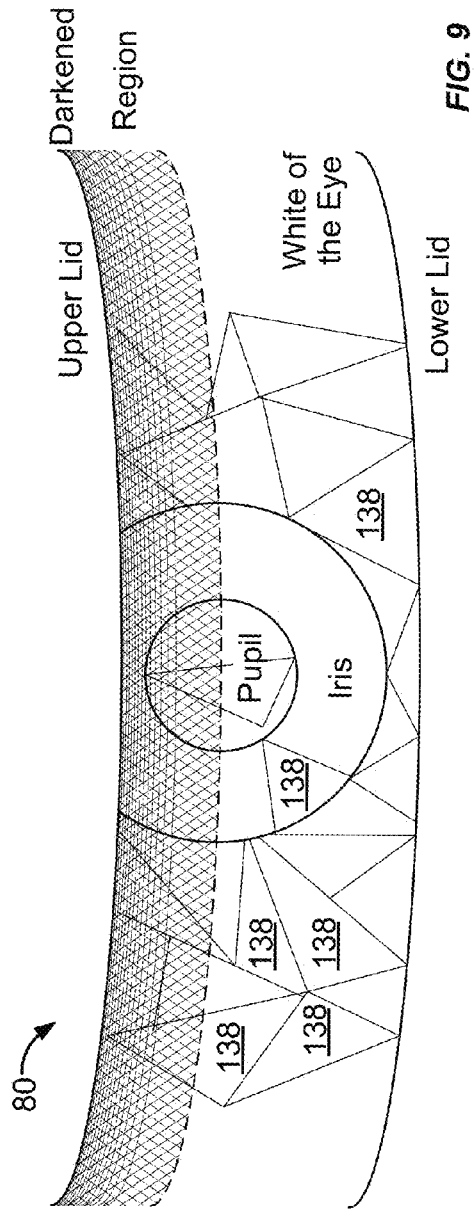

SYSTEM AND METHOD TO ACHIEVE BETTER EYELINES IN CG CHARACTERS

BACKGROUND OF THE INVENTION

In computer graphics, such as for movies and video games, it has always been difficult to create character eye action (or "eyelines") that seem lifelike. Character eyes often act lifeless, having little sense of reality about them. Thus, comparing what the animator envisions while constructing an image with the final rendered images can often yield dramatically different results.

The problem is compounded by the fact that in society much time is spent talking to others, and much of this time is spent making eye contact. Accordingly, most people are in essence eye "experts" and one is very quick to notice if something is wrong with the eyes of the person being looked at. Walt Disney is alleged to have stated that the audience generally fixates on character eyes, and great effort must be expended on these objects for characters to be convincing.

In one eyeline model, eyeballs are modeled as partial spheres, with concentric bands comprising polygons forming the pupil, iris, and white of the eye. The polygons are then shaded with texture maps. For example, a hemispherical model of an eye may be formed by a number of quadrilaterals, shaded to appear as the pupil, iris, and white. Realism may be enhanced by including reflections on the eye of light sources.

In eye tracking, the angles used to point the eyes at an object generally are such that the optical axes of each eye converge on a target on the object. Even with this enhanced realism, computer-generated eyes are often unsatisfactory.

Thus there is a need for a better model of computer-animated eyes.

SUMMARY OF THE INVENTION

Systems and methods disclosed here generally create better-looking animated eyes for CG characters. The systems and methods recognize that, due to the rounding of the skull, human (and other animal) eyes tend to "point out" a few degrees, e.g., 4°. While lines from each eye may converge somewhat, they generally do not converge precisely at a given target location on an object. The reason physical eyes still view objects in stereo vision is because the fovea or "visual center" of each eye is offset from the geometric back of the eye which intersects the optical axis, or put equivalently the visual axis is offset from the optical axis, by an angle called the "Angle Kappa".

So certain systems and methods set the rigging of each eye to, rather than precisely converge on a target location, converge but nevertheless be rotationally or angularly offset by the amount noted above, thus to simulate correct physical eye positioning and movements.

One enhancement of certain implementations is to take account of the refractive properties of the cornea, e.g., which can make the pupil appear larger than it actually is. Another enhancement may be to take account of a typical shadowing effect of the upper eye caused by the brow, eyelashes, and upper lid (as well as a lighting effect caused by reflection from the underside of the eyelashes). This darkening of the upper portion of the eye addresses vertical eyeline discrepancies caused by the visual and optical illusion of incorrect lighting.

Another enhancement may be to stabilize the movements of the eyelines. Convergence and divergence of the eyelines becomes especially prominent when focusing on targets within, e.g., 18-30 inches of the face, e.g., 24 inches. In other words, eye-angular changes are very prominent within this distance. Outside this distance, changes are more stable and less prominent. This aspect can be employed in the UI, which may include a mode that keeps the point of convergence, undergoing rotational offsetting, a proper set distance from the character, but the direction of which is controlled by the animator at a point closer in to the face, i.e., at a convenient distance (a "look-through" point) to the face.

In one aspect, the invention is directed towards a method of animating the eyes of a character, including: when eyes of a character are to fixate on or gaze at a target, defining an optical axis for each eye, the optical axis defined by a center of a pupil and a point on a back of the eye geometrically opposed to the pupil; and pointing the character's eyes at the target, where the pointing includes rotationally offsetting the optical axis such that the optical axis does not intersect the target but is oriented away from the target by an angle of between 2° and 15°.

Implementations of the invention may include one or more of the following. The number of eyes may be two, constituting a first eye and a second eye. If the character is human, the angle may be set to between 4° and 8°, e.g., between 4° and 6°. The optical axis may be defined by a perpendicular to the center of the pupil. The method may further include defining a first line segment between centers of the two eyes, bisecting the defined first line segment, and defining a second line segment from a center of the first line segment to the target. The optical axis of each eye and the first and second line segments may define a plane. The rotational offset of each eye may be in a direction away from the second line segment. The method may further include animating the eyes while the eyes are set at a fixation distance by moving a control handle, the control handle less than the fixation distance away from a center of the first line segment along a line collinear with the second line segment.

In a related aspect, the invention is directed towards a non-transitory computer-readable medium, including instructions for causing a computing environment to perform the above method.

In another aspect, the invention is directed towards a computing environment for creating a computer-generated character having two eyes, the computing environment including: memory for storing data about a first eye of a character, including data about a first optical axis, the optical axis defined by a center of a pupil and a point on a back of the first eye geometrically opposed to the pupil; memory for storing data about a second eye of the character, including data about a second optical axis, the optical axis defined by a center of a pupil and a point on a back of the second eye geometrically opposed to the pupil; and memory for configuring the first and second eye to fixate on or gaze at a target, the memory for configuring including instructions for pointing the optical axes at the target and includes rotationally offsetting the optical axis such that the optical axis does not intersect the target but is oriented away from the target by an angle of between 2° and 15°.

Implementations of the invention may include one or more of the following. The computing environment may further include memory configured to define a control handle, the control handle for animating the eyes by moving a direction the eyes are pointed at while maintaining a constant fixation distance, the control handle disposed between the target and the eyes. The computing environment may further include memory configured to define a control handle, the control handle for animating the eyes by moving a direction the eyes are pointed at, where a fixation distance scales with a distance of the control handle from the eyes, the control handle disposed between the target and the eyes.

In a further aspect, the invention is directed towards a method of animating the eyes of a character, including: storing data about an eye of a character, the eye modeled by at least a partial surface; and shading at least a top portion of the partial surface, the shading relative to a shading value of the remainder of the partial surface.

Implementations of the invention may include one or more of the following. The partial surface may be defined by a plurality of contiguous polygons or by a partial or complete sphere or ellipsoid. The shading may be between 40% and 60% of the shading value of the remainder of the partial surface. An area of the top portion may be equal to an area of the remainder, to within +/−25%.

In a related aspect, the invention is directed towards a non-transitory computer-readable medium, including instructions for causing a computing environment to perform the above method.

In yet another aspect, the invention is directed towards a method of animating the eyes of a character, including: storing data about at least one eye of a character, the eye modeled by at least a partial surface; and storing data about an appearance of the eye at a camera location, the stored data at least including data corresponding to a partial enlargement or a change of position or both of a pupil or iris of the eye caused by corneal refraction of the partial surface.

Implementations of the invention may include one or more of the following. The partial surface may be defined by a plurality of contiguous polygons or by a partial or complete sphere or ellipsoid. The enlargement may be between 0 and 15% of the unenlarged amount. The position change may be between 0 and 45 degrees of the unenlarged amount.

In a related aspect, the invention is directed towards a non-transitory computer-readable medium, including instructions for causing a computing environment to perform the above method.

Advantages of the invention may include one or more of the following. Using systems and methods according to arrangements described here, the direction of character eyes is initially defined in a correct manner and is described within a solid rig that allows correct alignment to be maintained during animation. In addition, physical visual cues are modeled that alter the perceived alignment of the eyes and ensures consistency between animation and final rendering. Using certain systems and methods described here, better looking animated eyes may be created by starting with a rig including properly rotationally-offset eyes, and maintaining the rotational offset while the eyes are moved to gaze at different targets according to the requirements of the scene. Better looking animated eyes may also be created by providing a level of darkening of the upper eyes, the darkening caused by shadows from structures around the eye, and compounded by occluded reflections tending to darken the upper eye further, as well as by including the effects of refraction caused by the cornea of the eye. A more convenient UI may be created within the context of certain implementations of the invention by allowing the animator to control a "look-through" point, rather than a "look at" point, where the "look at" point is generally a set distance, e.g., a fixation distance, from the character. By adding features that the time of animation, the animator may receive feedback more directly, so they may be more directly able to see what they are likely to get when the scene is rendered.

BRIEF DESCRIPTION OF THE DRAWINGS

FIG. 8 illustrates a schematic arrangement in which a top portion of an eye, modeled as a partial surface which may be spherical, is darkened to account for shadowing and lighting effects.

FIG. 9 illustrates a schematic arrangement similar to FIG. 8, in which the eye is modeled as a number of contiguous polygons.

Like reference numerals refer to like elements throughout.

DETAILED DESCRIPTION

Initially it is noted that, in a CG human, or any character with "normal binocular vision", in which both eyes look forward and converge on a single object, it is often incorrectly assumed that the default orientation of the eyes should be with their ocular or optical axis, i.e., the axis down the center of the eye and intersecting the center of the pupil, converging at a single point in front of the character. This convergence point must thus lie somewhere between the bridge of the character's nose and a faraway point, i.e., at infinity. The eye alignment is parallel when looking at infinity and cross-eyed when viewing an object very close to the face.

Figure 1:
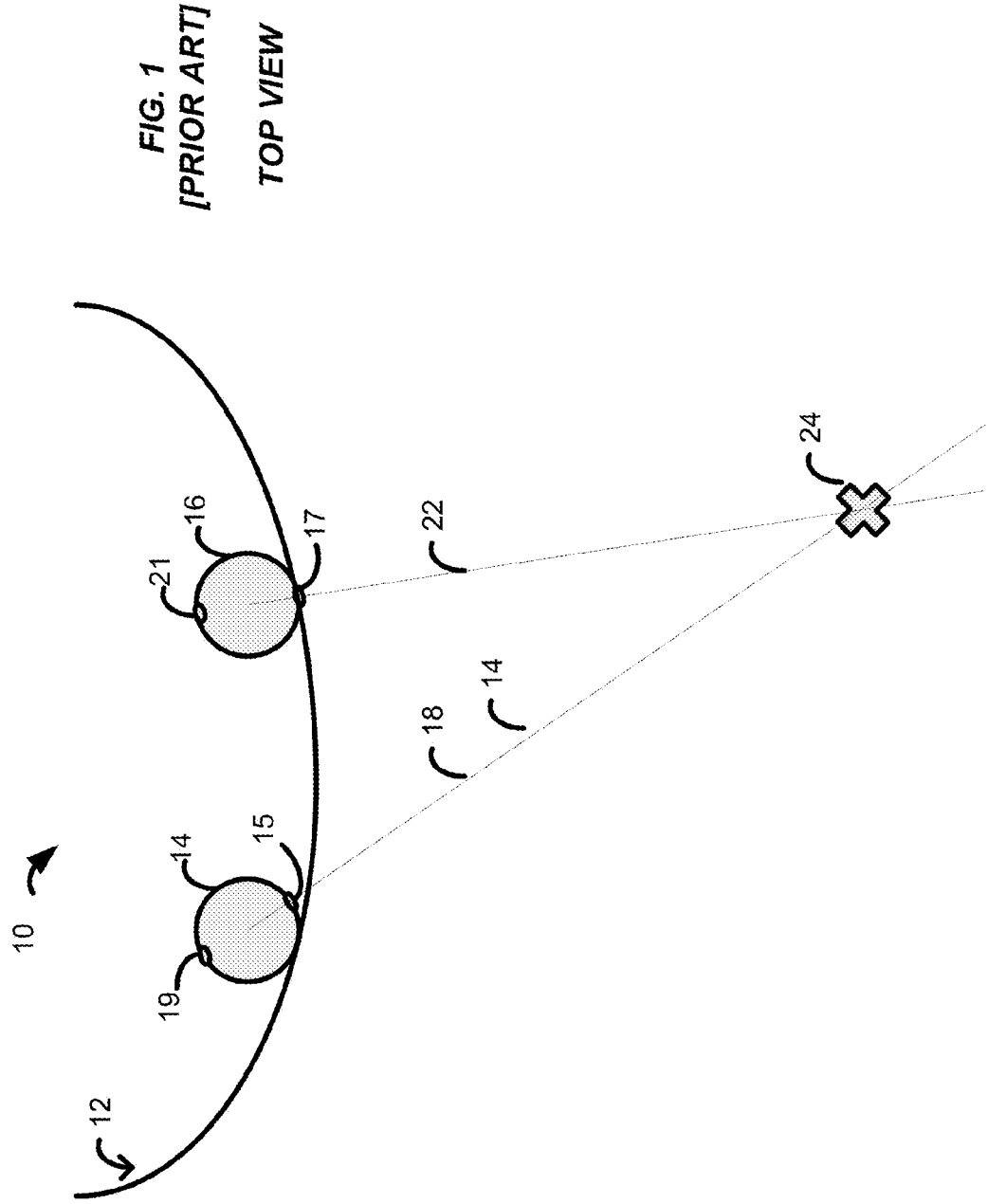
FIG. 1 illustrates a prior art schematic illustration where a computer-generated character's eyes are pointed at a target.

For example, referring to the prior art FIG. 1, a system 10 is illustrated including a top-down view of a character's face 12. The character has a left eye 14 and a right eye 16. Optical axes 18 and 22 are respectively shown, converging on a target 24. The optical axes extend from a pupil, e.g., a center of a pupil (15 and 17, respectively) to a point on the back of the eyeball geometrically opposed to the pupil (19 and 21, respectively). Thus, using the erroneous model described above, the eyes are somewhat cross-eyed for targets at finite distances.

However, in reality, human and other eyes point outward slightly, e.g., about 4° on average, due to curvature of the skull, and thus prior models do not correctly model the appearance of character's eyes. Certain implementations of the invention take advantage of this understanding to create more realistic-looking eyes for computer-generated characters.

One factor of note in this creation is the location of the pupil. One way a viewer analyzes pupil location is by noticing that there is normally a good balance between the visual components of the eyes. In other words, when a human is looking directly forward, the iris and pupil are central within the eye-opening, with about the same amount of the white of the eye (sclera) visible to either side (when viewed from the front, although the same should generally hold true from most angles where occlusion does not occur). The eyes are located at the front of the face but also slightly to the side, resulting in the outside corner of the eye being positionally further back than the inside corner. To achieve this visual balance, given the eye socket's orientation, explains why the eyes need to point out slightly.

Figure 2:
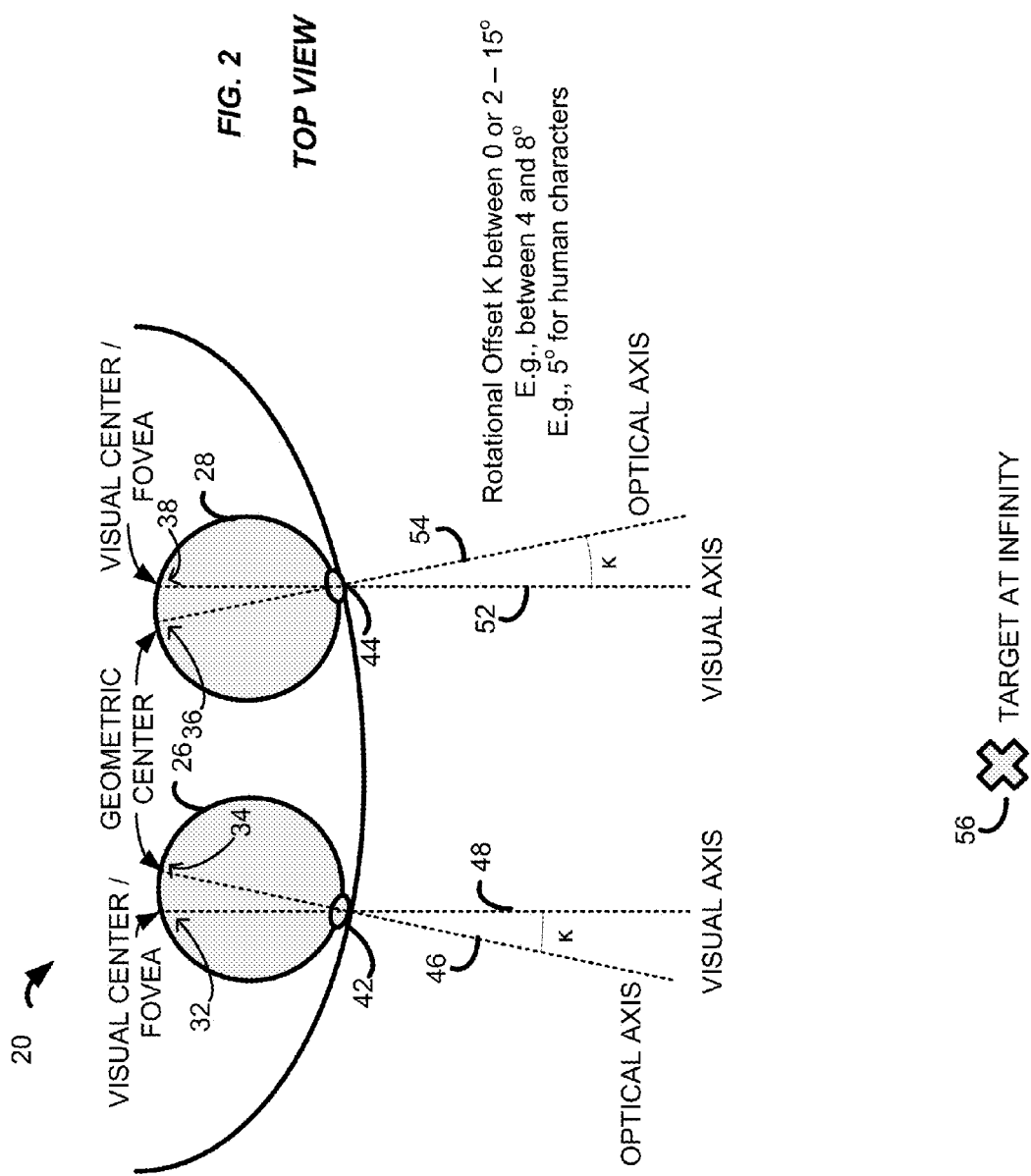
FIG. 2 illustrates a schematic arrangement according to an embodiment of the invention in which a computer-generated character's eyes are fixated on a target at infinity.

Humans can still achieve stereo vision, even with eyes pointing out slightly, in the following way. Referring to the system 20 of FIG. 2, eyes 26 and 28 use lenses like a camera to focus light from a target 56 in the real world onto the back of the eye. In FIG. 2, the eyes 26 and 28 appear to be gazing at, focusing on, or fixated at a fixation distance of infinity.

The rear part of the eye is called the retina. The retina has two major parts. A large area is used for peripheral vision. The image in this large area is blurry but is very efficient at seeing in low light and detecting movement. At the center of this area is the fovea 32 and 38, respectively. The fovea is generally about 1 mm wide but contains about 50% of the light receptors of the eye. This part of the eye is used for sharp focus and allows reading and other fine detail determination.

Generally the fovea 32 and 38 do not lie along the optical axes 46 or 54, respectively, where the optical axis is defined as an axis directly down the center of the eye from front to back and passing through the pupil. In other words, the optical axis extends from the pupil to a point on the back of the eye geometrically opposed to the pupil, referred to in FIG. 2 as the geometric center 34 and 36, respectively. The geometric center is also known as the optical center "OC". Instead, the fovea are displaced outwards slightly. In particular, the fovea 32 and 38 lay along respective visual axes 48 and 52, which are different from the optical axes and which start at the fovea and pass through the center of the pupil. The fovea has also been noted in the figures as the visual center "VC".

The angle between the visual axis and the optical axis is called the "angle Kappa (κ)". The angle Kappa generally varies from between 0° or 2° up to 15°. In many cases, for human or humanlike characters K is between 4° and 8°, e.g., between 4° and 6°.

By this analysis, the eyes can now be rotated outward slightly while still maintaining stereo vision. It is noted that the angle Kappa rotational offset is not always horizontal, e.g., the same can also be offset vertically a small amount. Nor do both eyes have to have the same amount or symmetrical offsets. Accordingly, asymmetrical eye positions can still be valid without obstructing stereo vision. Further, Angle Kappa can be negative, which results in a character appearing to be cross-eyed.

Figure 3:
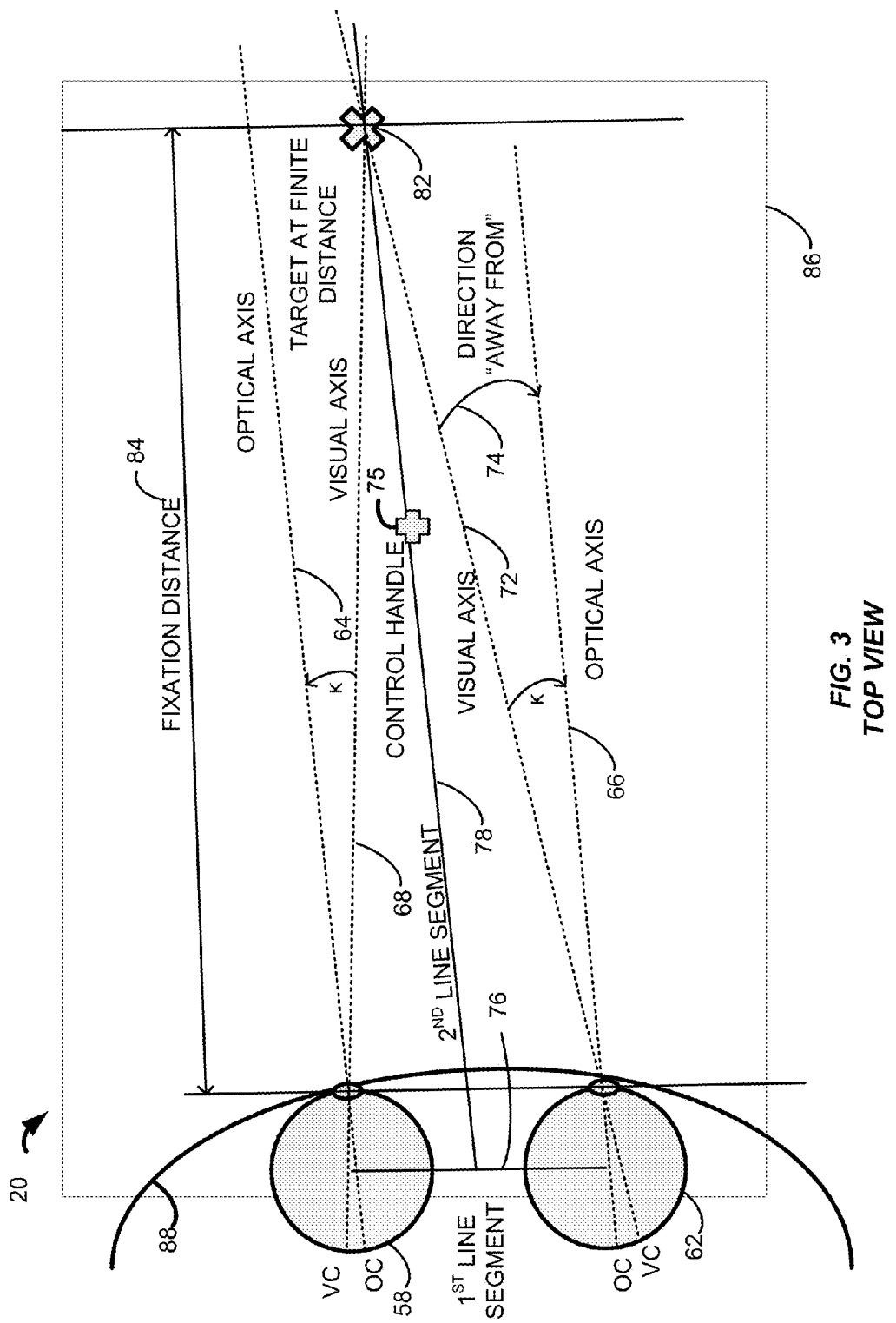
FIG. 3 illustrates a schematic arrangement according to an embodiment of the invention in which a computer-generated character's eyes are fixated on a target located at a finite distance from the eyes.

FIG. 3 illustrates the system 20 of FIG. 2 where a character 88 has eyes 58 and 62 that are fixated on a target 82 at a finite distance. This fixation distance is denoted by reference numeral 84. The fixation distance may be thought of as the average distance from the pupil to the target, a distance of either of the pupils to the target, or via other measurements. However, due to the general closeness of the pupils as compared to target distances, the choice of measurement is often inconsequential.

As illustrated in the figure, the first eye 58 has an associated optical axis 64 and a visual axis 68. The second eye 62 has an associated optical axis 66 and a visual axis 72. The angle between each respective optical axis and visual axis is indicated as angle Kappa κ, but as noted above these angles can differ. The angle 74 of the optical axis is in a direction "away from" the visual axis, and is also away from the second line segment and the other eye.

A first line segment 76 is illustrated between the pupils, and a second line segment 78 is illustrated that bisects the first line segment and extends to the target. A control handle 75 is illustrated disposed on the second line segment between the first line segment and the target. The control handle is described in greater detail below.

Rigging

Once the eyes are positioned correctly, the next step is to make sure they are rigged correctly. This is primarily performed by employing the visual axis in the rigging model instead of the optical axis. As a result, a convergence model is set up that maintains a rotational offset that keeps the eyes in their neutral position. The rigging process should usually not change the position of the eyes. While for a given actor the angle between the optical axis and the visual axis may not be known or may be difficult to obtain, the eyes may simply be initially positioned to match a reference or to conform with the desired visual balance, e.g., a common amount of sclera on each side of the iris and pupil. That is, the structure of the actor's face generally leads to a certain amount of "pointing out" given the requirements of visual balance, and so long as the angle between the eyes is maintained (for targets at a common fixation distance), the eyes will appear correct. As objects become relatively closer or further away, the eyes will converge or diverge, respectively.

The convergence distance of the underlying rigged should be estimated correctly. When capturing reference images on set, it is common to position the cameras a set distance away from a subject whenever possible. As an actor is typically instructed to look at the front camera, an assumption can be made that if the rig is built to converge at that distance, the angle Kappa offset may be calculated directly. Animating that convergence point should now correctly animate the eyes while maintaining the look of the character. It may then be counted upon that if the "look at" target is placed on a particular object in the scene, regardless of how it looks in animation, the character should render with the same eyelines that an actor would produce performing the same task in a real scene with the same lighting.

Ideally, the stability and correctness of the eyelines should be maintained no matter the fixation distance. As noted, eyes should converge more, i.e., be more cross-eyed, when looking at a close target and should diverge to parallel when looking far into the distance. In practice, convergence and divergence are only visible to a viewer when the point of focus is within about 24 inches of the face. The same gets more prominent the closer the target. Outside of this region, the change in convergence becomes very stable. For this reason, a mode is provided in the animation UI that keeps the point of convergence a constant fixation distance away from the eyes but allows the animator to control the direction the eyes point via use of the control handle noted above. Essentially, the control handle acts as a "look through" target instead of a "look at" target. In this mode, the animator can change the direction the eyes are pointing without concern of convergence because of the stability at longer fixation distances, allowing the animator to keep the control within a convenient distance to the face.

Figure 4:
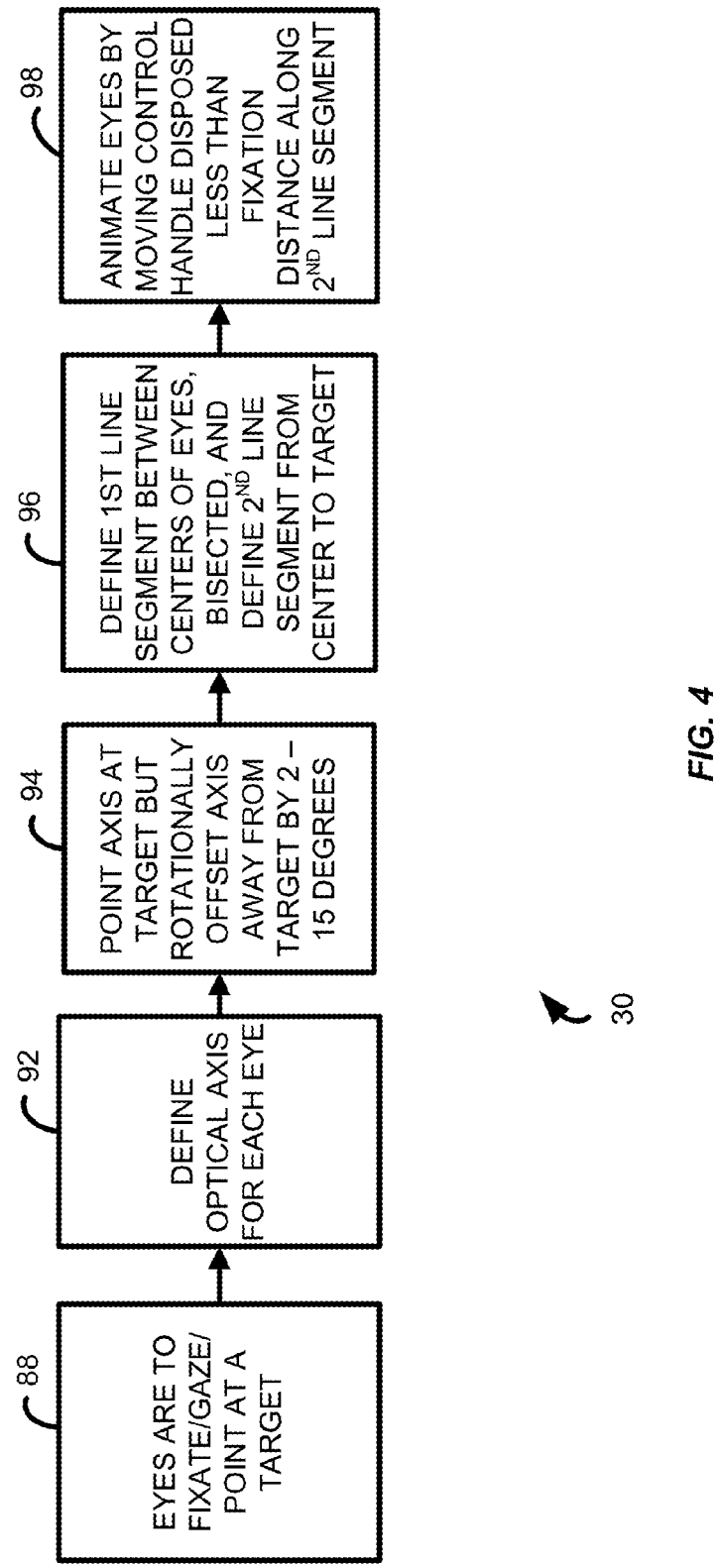
FIG. 4 is a flowchart illustrating a method according to an embodiment of the invention.

FIG. 4 illustrates a flowchart 30 of a method according to an embodiment of the invention. In a first step, an animator desires to have a character's eyes fixate, gaze, or otherwise point at a target (step 88). An optical axis is defined for each eye (step 92). The optical axis is pointed at a target but is rotationally offset away from the target by 0° or 2° to 15° (step 94). Equivalently, a visual axis is defined that is rotationally offset away from the optical axis by 0° or 2° to 15°, and the visual axis is pointed directly at the target. Optionally, a first line segment is defined between the pupils, e.g., between the centers of the pupils, is bisected, and a second line segment is defined between the point of bisection, e.g., the center of the first line segment, and the target (step 96). An animator may then animate the eyes by moving a control handle (step 98), the control handle disposed less than the fixation distance along the second line segment from the point of bisection. The fixation distance is as defined above, e.g., the length of the second line segment, an average distance between the eyes and the target, a particular distance between a given eye and the target, or the like.

Figure 5:
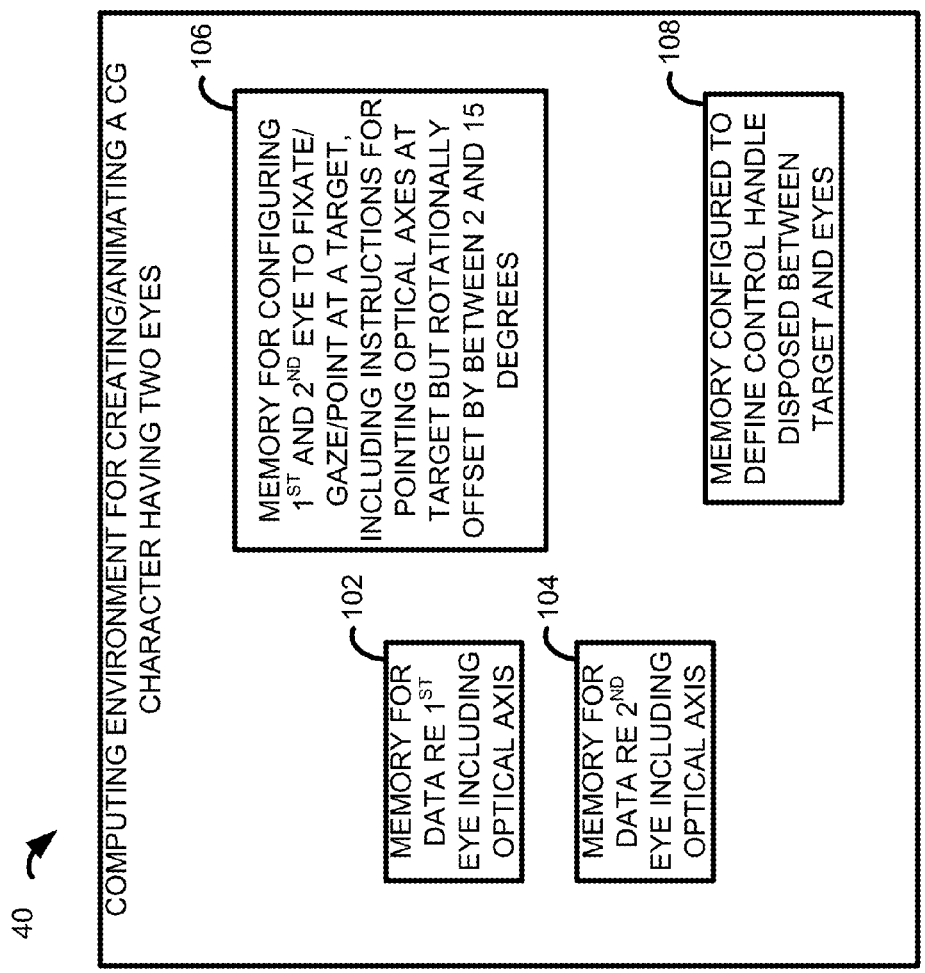
FIG. 5 illustrates an exemplary computing environment incorporating memories which store data and instructions useful in carrying out certain methods disclosed here, including an implementation of the method of FIG. 4.

FIG. 5 illustrates a computing environment 40 for creating or animating a CG character's eyes. The computing environment, which may be a distributed computing environment, includes a memory 102 storing data regarding a first eye including an optical axis or a visual axis or both. The computing environment also includes a memory 104 having stored data regarding a second eye, again including an optical axis or visual axis. The computing environment further includes a memory 106 for configuring the first and second eye to fixate, gaze, or point at a target. The memory 106 may include instructions for pointing the optical axes at the target but rotationally offsetting such axes by 0° or 2° to 15°. Equivalently, the memory 106 may include a memory for configuring the first and second eye to point at a target by including instructions for pointing visual axes directly at the target, where the visual axes are offset by respective optical axes by the above amounts. The computing environment 40 may further include a memory 108 configured to define a control handle disposed between the eyes and the target. Any or all of the above-noted memories may include non-transitory computer-readable media.

Another aspect that affects eyelines is refraction. In particular, for an eye to work, it must focus light from the environment onto the back of the retina, where the image is processed. To perform this task, lenses are used to converge the light entering the eye. Although the lens that controls changing focus sits just behind the pupil, approximately ⅔ of the optical power of the eye, i.e., its ability to refract light, occurs in the cornea. Unlike the lens, the refraction by the cornea is generally fixed. In most cases, it is not necessary to replicate the action of the inner lens, but the visual effect that the cornea refraction produces can be important to eyelines.

For example, when looking at a person wearing strong eyeglasses, their eyes appear larger than they actually are. Similarly, when the iris and pupil are viewed through the curved surface of the cornea, the pupil appears bigger than it actually is. This produces a discrepancy in pupil size between the animation and the final rendering, and when viewed at an angle, the position as well as the size of the iris and pupil can change considerably compared to an un-refracted model. Visualizing refraction during animation is thus an important factor. The refractive power of the cornea is approximately 43 dioptres, meaning that the cornea can bring parallel rays of light together in 1/43 meters, or about 23 mm.

Figure 6:
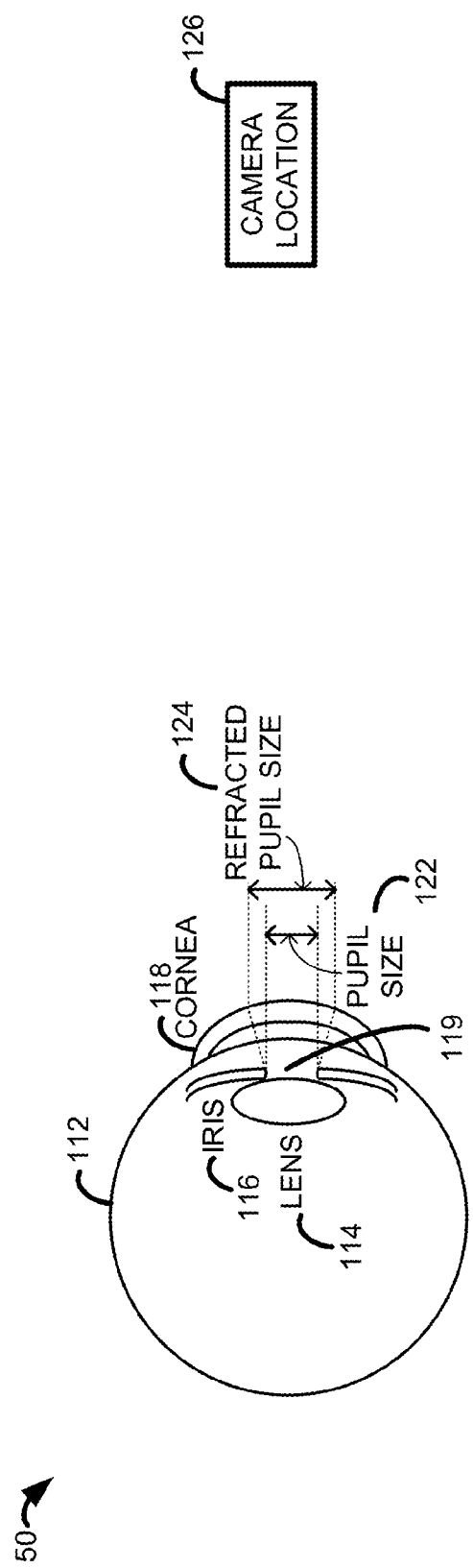
FIG. 6 illustrates a schematic arrangement in which a computer-generated character's eye is received at a camera location, and in which the pupil and/or iris are enlarged to account for refraction by the cornea.

This situation is illustrated in the system 50 of FIG. 6. In this case only one eye 112 is shown. The character eye 112 is viewed at a camera location 126. The eye includes a lens 114, an iris 116 which also defines a pupil 119, and the cornea 118. The un-refracted pupil size is illustrated by reference numeral 122, and the refracted or enlarged pupil size is illustrated by reference numeral 124. In the system of FIG. 6, the camera location 126 is pointing at the eye roughly head-on. In an off-axis configuration, not only the enlargement would occur but also the position of the iris and pupil may change. Off-axis, the position generally changes such that more of the pupil and iris are visible than would be seen in the un-refracted state.

Figure 7:
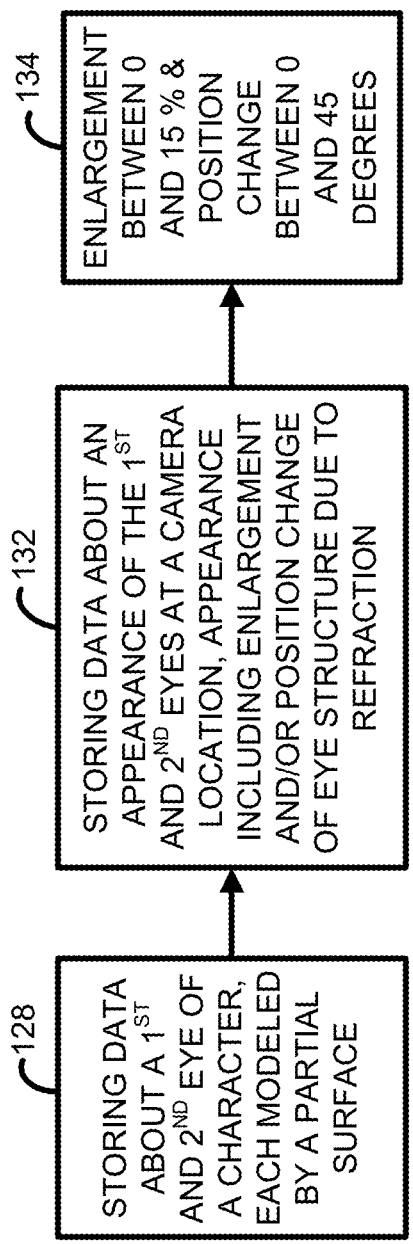
FIG. 7 is a flowchart illustrating a method according to another embodiment of the invention.

FIG. 7 illustrates a flowchart 60 of another method according to an implementation of the invention. In the flowchart 60, a first step is that of storing data about a first and second eye of a character, each modeled by a partial surface (step 128). Data is then stored about an appearance of the first and second eyes at a camera location, the appearance including an enlargement and/or change of position of at least one eye structure due to refraction of the cornea (step 132). The eye structure is generally that of the pupil or iris, or both, as the sclera may be more difficult to gauge. As shown in the flowchart, the enlargement may be between about 0 and 15% (step 134). The position change may be between about 0 and 45 degrees.

While FIG. 7 illustrates the method with respect to two eyes, only one eye may undergo refraction as, e.g., only one eye may be visible in a given scene. Alternatively, for certain characters, more than two eyes may be the subject of the method.

The above-noted effect of corneal refraction is one phenomenon that may be reproduced in the animation scene for better results in the final rendered line of sight of a character. A further enhancement involves the effect of lighting. In particular, when animating a character, the animator generally sees a representation of the character that allows for reasonable interaction. As the animation process happens midway through the production pipeline, various components have not yet been introduced, including final lighting, extra texture detail, and compositing for rendering additions. Lighting can play a very important role in how something looks. Applying final lighting in the animation scene and rendering with the same renderer that is used on the backend would be ideal, but such renderers are not interactive so that at best could only serve as an off-line process late in the shot timeline when the lighting setups become available. That is, at the time of animation, it is not generally known what lighting will be like. Even if it was known, the animator may not have the actual lighting setup available. One option is to implement a common default lighting model. However, it is not the lighting direction that causes the majority of eyeline discrepancies, but the lack of shadows on the eye itself Lighting direction does have an impact on how the shadows fall across the eye regions, but a more common problem is the lack of a dark region just below the upper eye lid area. This darkness is a combination of shadows from the brow, eyelashes, and upper lid, but is also darkened by reflections from the underside of the eyelashes. Such an effect occurs in nearly all cases, excepting, e.g., severely underlit faces. Accordingly, a correction for this effect may be introduced in the animation eye shader.

An issue with this correction is producing a fast way of adding a dark region while having the same track correctly with the upper eye lid. To provide a rapid calculation, a full shadow calculation is undesirable. However, there is a behavior of the eye that can be leveraged. In particular, the upper eyelid tends to track just above the line of the pupil. Therefore, the region that should be darkened on the eye, from just above the line of the pupil down to about the middle of the eye, or equivalently down to the portion of the eye having a perpendicular to the surface pointing in an upward direction, is generally fairly stable. There are certain exceptions, when the eyes are wide open, e.g., in a surprised look, or during blinking. Blinking can be ignored as the eyes are obscured anyway. In the case of a surprised expression, it may be necessary to adjust or eliminate the effect.

If a darkened overlay is introduced that shades the top portion of the eyeball, remaining dark until a default upper eyelid line is passed and then tapering as the same extends to the center of the pupil, a significant improvement in eyeline is obtained. The effect could be receded if the eyes are wide open or to accommodate other lighting effects.

In more detail, referring to the system 70 of FIG. 8, an eye system is illustrated having an iris 138 and a pupil 142. An upper eyelid 144 is illustrated that tracks just above the top of the pupil 142. The lower eyelid 146 is also illustrated. The sclera or white of the eye 136 is depicted between the upper and lower lids. A darkened region 148 is illustrated on the top portion of the eye between the center of the pupil and the upper eye lid 144. While the darkened region 148 is shown to have a constant shading value, the same may actually have a maximum near the upper lid and a minimum at the edge on the side of the region adjacent the pupil. The value of the shading may be, e.g., between about 40% and 60% of the shading value of the remainder of the eye, e.g., that of the sclera, the pupil, or the iris, i.e., the surfaces forming the remainder of the visible eye. The area of the top portion and that of the remainder may have substantially equal areas, e.g., to within 25%, 10%, 5%, or the like The surfaces forming the eye model may be partial surfaces, such as partial spheres. Alternatively, as shown in the system 80 of FIG. 9, the surfaces may be a set of contiguous polygons. Generally, the eye models may be represented as NURBS or polygon meshes of either a spherical or more geometrically accurate representation.

Figure 10:
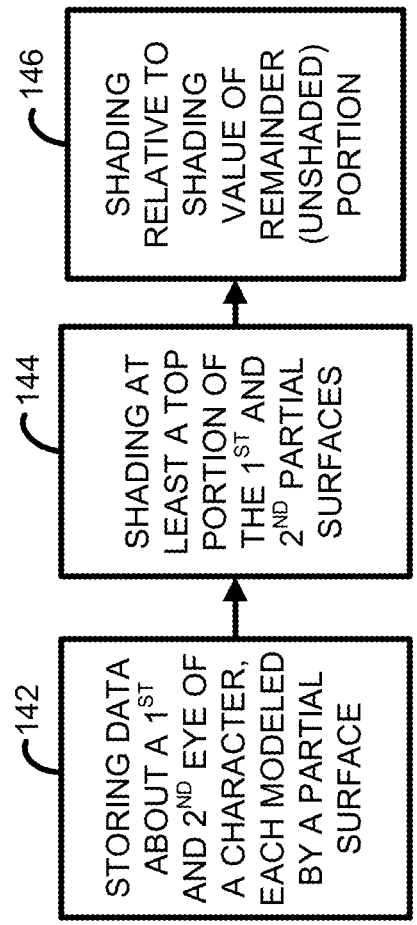
FIG. 10 is a flowchart illustrating a method according to a further embodiment of the invention.

FIG. 10 illustrates a flowchart 90 of another method according to an implementation of the invention. In the flowchart 90, a first step is that of storing data about a first and second eye of a character, each modeled by a partial surface (step 142). A shading step is then performed of at least a top portion of the first and second partial surfaces (step 144). As shown in the flowchart, the shading may be relative to a shading value of the remainder for unshaded portion, e.g., may be between about 40 and 60% of the remainder (step 146). As will be understood, the actual value used is up to the desire of the animator. As with FIG. 7, more or less than two eyes may also be accommodated in the system and method.

Systems and methods have been described for the convenient creation and animation of highly realistic eyes for CG characters. The system takes account not only of a more accurate eye model for tracking eye pointing, but also phenomena such as corneal refraction and upper eye shadowing.

Variations of the systems and methods will also be understood. For example, while arrangements have been described for characters having two eyes, characters with any number of eyes may have their eyes animated using the disclosed arrangements. In this case, an optical or visual axis is defined for each eye, and the same directed at the target as described. Moreover, while the control handle has been described as moving a pointing direction of the eyes while maintaining a constant fixation distance, the same may also be configured to allow differing fixation distances. For example, the fixation distance may scale with the amount of movement of the control handle, e.g., a movement of the control handle of one unit may translate to an amount of movement of 10 units in the fixation distance. Other such variations will also be understood. For example, while eye models have been described comprised of partial spheres or surfaces of contiguous polygons, other shapes will also be understood, such as ellipsoids or partial ellipsoids.

Figure 11:
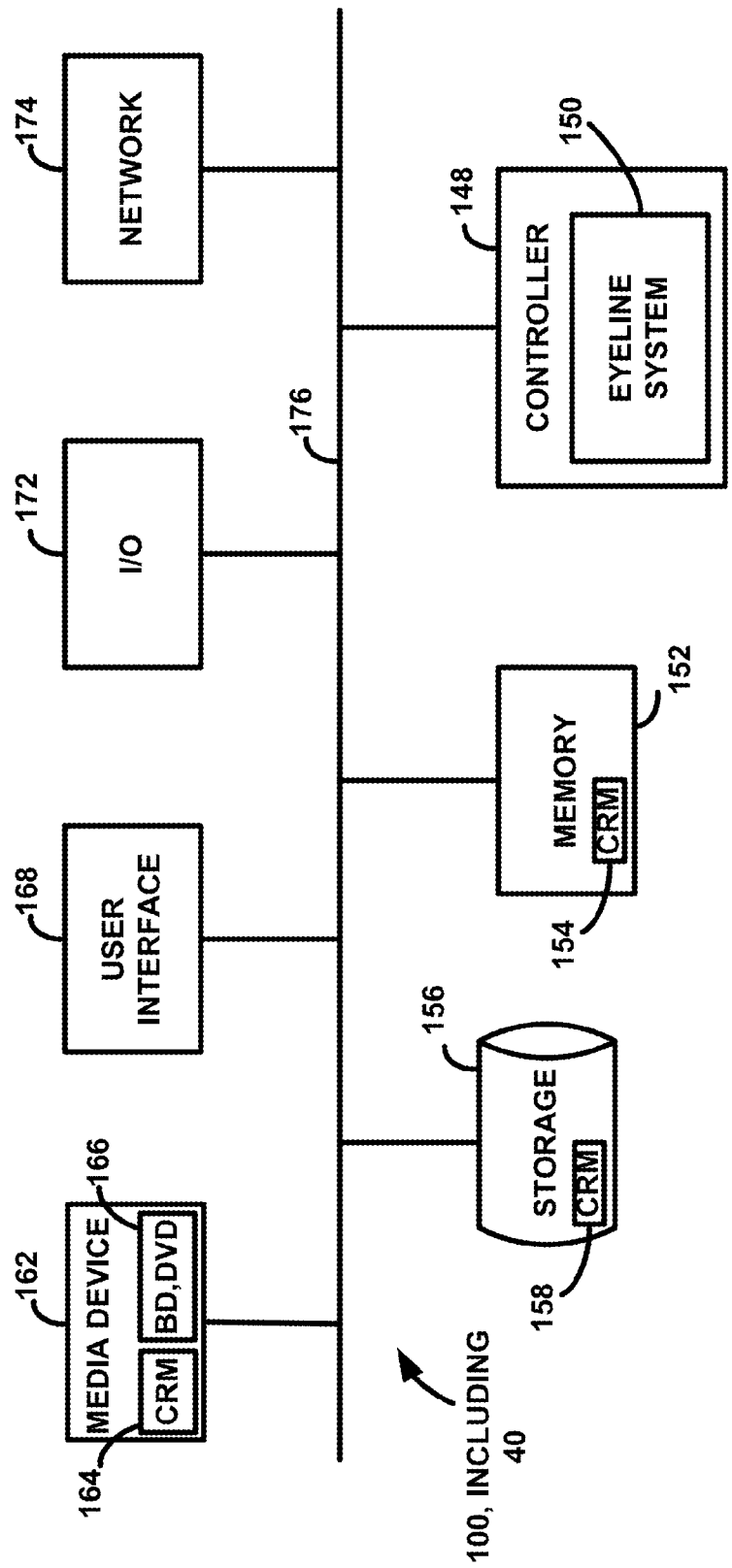
FIG. 11 illustrates a computing environment useful for carrying out methods according to embodiments of the invention.

One implementation includes one or more programmable processors and corresponding computing system components to store and execute computer instructions, such as to execute the code that provides the various animation functions disclosed and discussed above. Referring to FIG. 11, a representation of an exemplary computing environment is illustrated, which may represent one or more computing environments, including computing environment 40.

The computing environment includes a controller 148, a memory 152, storage 156, a media device 162, a user interface 168, an input/output (I/O) interface 172, and a network interface 174. The components are interconnected by a common bus 176. Alternatively, different connection configurations can be used, such as a star pattern with the controller at the center.

The controller 148 includes a programmable processor and controls the operation of the computing environment and its components. The controller 148 loads instructions from the memory 152 or an embedded controller memory (not shown) and executes these instructions to control the eyeline system 150.

Memory 152, which may include non-transitory computer-readable memory 154, stores data temporarily for use by the other components of the system. In one implementation, the memory 152 is implemented as DRAM. In other implementations, the memory 152 also includes long-term or permanent memory, such as flash memory and/or ROM.

Storage 156, which may include non-transitory computer-readable memory 158, stores data temporarily or long-term for use by other components of the computing environment, such as for storing data used by the system. In one implementation, the storage 156 is a hard disc drive or a solid state drive.

The media device 162, which may include non-transitory computer-readable memory 164, receives removable media and reads and/or writes data to the inserted media. In one implementation, the media device 162 is an optical disc drive or disc burner, e.g., a writable Blu-ray® disc drive 166.

The user interface 168 includes components for accepting user input, e.g., the user indications of animated eyes, targets, shading values, movements of the control handle, and the like. In one implementation, the user interface 168 includes a keyboard, a mouse, audio speakers, and a display. The controller 148 uses input from the user to adjust the operation of the computing environment.

The I/O interface 172 includes one or more I/O ports to connect to corresponding I/O devices, such as external storage or supplemental devices, e.g., a printer or a PDA. In one implementation, the ports of the I/O interface 172 include ports such as: USB ports, PCMCIA ports, serial ports, and/or parallel ports. In another implementation, the I/O interface 172 includes a wireless interface for wireless communication with external devices.

The network interface 174 allows connections with the local network and includes a wired and/or wireless network connection, such as an RJ-45 or Ethernet connection or WiFi interface (802.11). Numerous other types of network connections will be understood to be possible, including WiMax, 3G or 4G, 802.15 protocols, 802.16 protocols, satellite, Bluetooth®, or the like.

The computing environment may include additional hardware and software typical of such devices, e.g., power and operating systems, though these components are not specifically shown in the figure for simplicity. In other implementations, different configurations of the devices can be used, e.g., different bus or storage configurations or a multi-processor configuration.

The present invention has been described with respect to specific embodiments, which have been presented merely as exemplary ways that described arrangements. Accordingly, the present invention is not limited to only those implementations described above.

The invention claimed is:

1. A method of animating the eyes of a character, comprising:
  a. when eyes of a character are to fixate on or gaze at a target, defining a visual axis for each eye, wherein the visual axis is used to point the eye during animation, the visual axis having a fixed rotational offset from the ocular axis of the eye, wherein the ocular axis is defined by a line passing through a center of the eye and the center of a pupil of the eye, wherein the number of eyes is two, constituting a first eye and a second eye, and further comprising defining a gaze direction vector as a line segment between a point directly between the centers of the two eyes and a gaze target control handle;
  b. such that the fixed rotational offset accounts for a positional offset of a fovea at a back of the eye, such that a natural and realistic eye position is created and defined throughout animated motion.

2. The method of claim 1, wherein if the character is human, setting the fixed rotational offset between the visual axis and the ocular axis to between 4° and 8°.

3. The method of claim 2, further comprising setting the fixed rotational offset to about 5°.

4. The method of claim 1, further comprising allowing a gaze target to reside at a location of the control handle or at a location along of the gaze direction vector by specifying a fixed location on the gaze direction vector, whereby the gaze target may remain close to the eyes for accessibility while maintaining a neutral and stable convergence.

5. A non-transitory computer-readable medium, comprising instructions for causing a computing environment to perform the method of claim 1.

6. A computing environment for creating a computer-generated character having two eyes, the computing environment comprising:
  a. memory for storing data about a first eye of a character, including data about a first visual axis, the first visual axis having a fixed rotational offset from an ocular axis of the eye, wherein the ocular axis is defined by a line passing through a center of the eye and a center of a pupil;
  b. memory for storing data about a second eye of a character, including data about a second visual axis, the second visual axis having a fixed rotational offset from an ocular axis of the eye, wherein the ocular axis is defined by a line passing through a center of the eye and a center of a pupil; and
  c. memory configured to define a control handle, the control handle for animating the first and second eyes by moving a target the eyes are pointed at, where a fixation distance scales with a distance of the control handle from the eyes, and wherein the control handle is disposed between the target and the eyes, d. such that the fixed rotational offset accounts for a positional offset of a fovea at a back of the eye, such that the computing environment creates and defines a natural and realistic eye position throughout animated motion.

7. A computing environment for creating a computer-generated character having two eyes, the computing environment comprising:
  a. memory for storing data about a first eye of a character, including data about a first visual axis, the first visual axis having a fixed rotational offset from an ocular axis of the eye, wherein the ocular axis is defined by a line passing through a center of the eye and a center of a pupil;
  b. memory for storing data about a second eye of a character, including data about a second visual axis, the second visual axis having a fixed rotational offset from an ocular axis of the eye, wherein the ocular axis is defined by a line passing through a center of the eye and a center of a pupil; and
  c. memory configured to define a control handle, the control handle for animating the first and second eyes by moving a target the eyes are pointed at, where a fixation distance is constant with respect to a distance of the control handle from the eyes, and wherein the control handle is disposed between the target and the eyes, d. such that the fixed rotational offset accounts for a positional offset of a fovea at a back of the eye, such that the computing environment creates and defines a natural and realistic eye position throughout animated motion.

8. A method of animating the eyes of a character, comprising:
  a. when eyes of a character are to fixate on or gaze at a target, wherein the number of eyes is two, constituting a first eye and a second eye, defining an optical axis for each eye, the optical axis defined by a center of a pupil and a point on a back of the eye geometrically opposed to the pupil;
  b. defining a first line segment between centers of the two eyes, bisecting the defined first line segment, and defining a second line segment from a center of the first line segment to the target;
  c. pointing the character's eyes at the target, wherein the pointing includes rotationally offsetting the optical axis such that the optical axis does not intersect the target but is oriented away from the target by an angle of between 2° and 15°; and
  d. animating the eyes while the eyes are set at a fixation distance by moving a control handle, the control handle less than the fixation distance away from a center of the first line segment along a line collinear with the second line segment.

9. A computing environment for creating a computer-generated character having two eyes, the computing environment comprising:
  a. memory for storing data about a first eye of a character, including data about a first optical axis, the optical axis defined by a center of a pupil and a point on a back of the first eye geometrically opposed to the pupil;
  b. memory for storing data about a second eye of the character, including data about a second optical axis, the optical axis defined by a center of a pupil and a point on a back of the second eye geometrically opposed to the pupil; and
  c. memory for configuring the first and second eye to fixate on or gaze at a target, the memory for configuring including instructions for pointing the optical axes at the target and includes rotationally offsetting the optical axis such that the optical axis does not intersect the target but is oriented away from the target by an angle of between 2° and 15°; and
  d. memory configured to define a control handle, the control handle for animating the eyes by moving a direction the eyes are pointed at while maintaining a constant fixation distance, the control handle disposed between the target and the eyes.

10. A computing environment for creating a computer-generated character having two eyes, the computing environment comprising:
   a. memory for storing data about a first eye of a character, including data about a first optical axis, the optical axis defined by a center of a pupil and a point on a back of the first eye geometrically opposed to the pupil;
   b. memory for storing data about a second eye of the character, including data about a second optical axis, the optical axis defined by a center of a pupil and a point on a back of the second eye geometrically opposed to the pupil; and
   c. memory for configuring the first and second eye to fixate on or gaze at a target, the memory for configuring including instructions for pointing the optical axes at the target and includes rotationally offsetting the optical axis such that the optical axis does not intersect the target but is oriented away from the target by an angle of between 2° and 15°; and
   d. memory configured to define a control handle, the control handle for animating the eyes by moving a direction the eyes are pointed at, where a fixation distance scales with a distance of the control handle from the eyes, the control handle disposed between the target and the eyes.

* * * * *